US010934447B2

(12) United States Patent
Swogger et al.

(10) Patent No.: US 10,934,447 B2
(45) Date of Patent: Mar. 2, 2021

(54) EPOXY RESIN DISPERSIONS COMPRISING DISCRETE CARBON NANOTUBES

(71) Applicant: MOLECULAR REBAR DESIGN, LLC, Austin, TX (US)

(72) Inventors: Kurt W. Swogger, Austin, TX (US); Clive P. Bosnyak, Dripping Springs, TX (US)

(73) Assignee: Molecular Rebar Design, LLC, Austin, TX (US)

( * ) Notice: Subject to any disclaimer, the term of this patent is extended or adjusted under 35 U.S.C. 154(b) by 487 days.

(21) Appl. No.: 16/012,265

(22) Filed: Jun. 19, 2018

(65) Prior Publication Data

US 2018/0298221 A1 Oct. 18, 2018

Related U.S. Application Data

(63) Continuation-in-part of application No. 15/840,174, filed on Dec. 13, 2017, now Pat. No. 10,000,653, which is a continuation of application No. 15/496,721, filed on Apr. 25, 2017, now abandoned, which is a continuation-in-part of application No. 15/288,553, filed on Oct. 7, 2016, now Pat. No. 9,636,649, which is a continuation-in-part of application No. 15/225,215, filed on Aug. 1, 2016, now Pat. No. 9,493,626, which is a continuation-in-part of application No. 15/166,931, filed on May 27, 2016, now Pat. No. 9,422,413, which is a continuation of application No. 14/924,246, filed on Oct. 27, 2015, now Pat. No. 9,353,240, which is a continuation of application No. 13/993,206, filed as application No. PCT/EP2011/072427 on Dec. 12, 2011, now Pat. No. 9,212,273.

(60) Provisional application No. 61/423,033, filed on Dec. 14, 2010.

(51) Int. Cl.
| | |
|---|---|
| *C09D 11/52* | (2014.01) |
| *C09D 7/61* | (2018.01) |
| *C09D 7/62* | (2018.01) |
| *C09D 5/02* | (2006.01) |
| *C09D 5/24* | (2006.01) |
| *C09D 11/03* | (2014.01) |
| *C09D 11/033* | (2014.01) |
| *C09D 11/037* | (2014.01) |
| *C09D 11/106* | (2014.01) |
| *C08K 3/04* | (2006.01) |
| *B82Y 30/00* | (2011.01) |
| *B82Y 40/00* | (2011.01) |
| *C09D 7/40* | (2018.01) |

(52) U.S. Cl.
CPC .............. *C09D 11/52* (2013.01); *C09D 5/024* (2013.01); *C09D 5/24* (2013.01); *C09D 7/62* (2018.01); *C09D 7/70* (2018.01); *C09D 11/03* (2013.01); *C09D 11/033* (2013.01); *C09D 11/037* (2013.01); *C09D 11/106* (2013.01); *B82Y 30/00* (2013.01); *B82Y 40/00* (2013.01); *C08K 3/041* (2017.05); *C09D 7/61* (2018.01); *Y10S 977/734* (2013.01); *Y10S 977/753* (2013.01); *Y10S 977/842* (2013.01); *Y10S 977/892* (2013.01); *Y10S 977/932* (2013.01)

(58) Field of Classification Search
CPC . C09D 11/52; C09D 7/70; C09D 7/62; C09D 5/024; C09D 5/24; C09D 11/03; C09D 11/033; C09D 11/037; C09D 11/106; C09D 7/61; C08K 3/041; B82Y 30/00; B82Y 40/00; Y10S 977/734; Y10S 977/753; Y10S 977/842; Y10S 977/892; Y10S 977/932
USPC ........................................................ 524/495
See application file for complete search history.

(56) References Cited

U.S. PATENT DOCUMENTS

2010/0122642 A1* 5/2010 Farrugia .............. C09D 11/101
106/31.29

* cited by examiner

*Primary Examiner* — Ling Siu Choi
*Assistant Examiner* — Ronald Grinsted
(74) *Attorney, Agent, or Firm* — Stephen P. Krupp

(57) ABSTRACT

This present invention relates to oxidized, discrete carbon nanotubes in dispersions, especially for use in epoxy compositions. The dispersions can include materials such as elastomers, thermosets and thermoplastics or aqueous dispersions of open-ended carbon nanotubes with additives. A further feature of this invention relates to the development of a dispersion of oxidized, discrete carbon nanotubes with epoxy that are resistant to weather and/or crack propagation.

21 Claims, No Drawings

US 10,934,447 B2

EPOXY RESIN DISPERSIONS COMPRISING DISCRETE CARBON NANOTUBES

CROSS-REFERENCES

This application is a continuation-in-part application of U.S. Ser. No. 15/840,174, filed on Dec. 13, 2017, and allowed on Apr. 11, 2018, and issuing as U.S. patent Ser. No. 10/000,653, which is a continuation of U.S. Ser. No. 15/496,721, filed Apr. 25, 2017, abandoned, which was a continuation-in-part application of U.S. Ser. No. 15/288,553 filed Oct. 7, 2016 and allowed Mar. 21, 2017 to be issued as U.S. Pat. No. 9,636,649, which was a continuation-in-part application of U.S. Ser. No. 15/225,215 filed Aug. 1, 2016, allowed Sep. 12, 2016 and issued as U.S. Pat. No. 9,493,626 which was a continuation-in-part application of U.S. Ser. No. 15/166,931 filed May 27, 2016 and issued as U.S. Pat. No. 9,422,413 which was a continuation of U.S. Ser. No. 14/924,246, filed Oct. 27, 2015 and issued as U.S. Pat. No. 9,353,240, which is a continuation of U.S. Ser. No. 13/993,206, filed Jun. 11, 2013 and issued as U.S. Pat. No. 9,212,273, which claims priority to PCT/EP2011/072427, filed Dec. 12, 2011, which claims benefit of U.S. provisional application 61/423,033, filed Dec. 14, 2010. All of the afore-mentioned U.S. applications and/or granted patents are expressly incorporated herein by reference. This application is also related to U.S. Ser. Nos. 62/319,599; 14/585,730; 14/628,248; and Ser. No. 14/963,845.

FIELD OF INVENTION

The present invention is directed to novel compositions and methods for producing epoxy composite blends with discrete carbon nanotubes.

BACKGROUND OF THE INVENTION

Carbon nanotubes can be classified by the number of walls in the tube, single-wall, double wall and multiwall. Each wall of a carbon nanotube can be further classified into chiral or non-chiral forms. Carbon nanotubes are currently manufactured as agglomerated nanotube balls or bundles. Use of carbon nanotubes as a reinforcing agent in polymer composites is an area in which carbon nanotubes are predicted to have significant utility. However, utilization of carbon nanotubes in these applications has been hampered due to the general inability to reliably produce individualized carbon nanotubes. To reach the full potential of performance enhancement of carbon nanotubes as composites in polymers the aspect ratio, that is length to diameter ratio, should be substantially greater than 40. The maximum aspect ratio for a given tube length is reached when each tube is fully separated from another. A bundle of carbon nanotubes, for example, has an effective aspect ratio in composites of the average length of the bundle divided by the bundle diameter.

Various methods have been developed to debundle or disentangle carbon nanotubes in solution. For example, carbon nanotubes may be shortened extensively by aggressive oxidative means and then dispersed as individual nanotubes in dilute solution. These tubes have low aspect ratios not suitable for high strength composite materials. Carbon nanotubes may also be dispersed in very dilute solution as individuals by sonication in the presence of a surfactant. Illustrative surfactants used for dispersing carbon nanotubes in aqueous solution include, for example, sodium dodecyl sulfate, or cetyltrimethyl ammonium bromide. In some instances, solutions of individualized carbon nanotubes may be prepared from polymer-wrapped carbon nanotubes. Individualized single-wall carbon nanotube solutions have also been prepared in very dilute solutions using polysaccharides, polypeptides, water-soluble polymers, nucleic acids, DNA, polynucleotides, polyimides, and polyvinylpyrrolidone. The dilution ranges are often in the mg/liter ranges and not suitable for commercial usage.

Coatings comprising dispersed carbon nanotubes and epoxy are highly desirable, especially in weather exposure conditions. Such conditions include salt water contact and/or high ultraviolet (UV) exposure.

Essential to the aforementioned products is their generally high degree of distribution. The materials and processes used must therefore enable the resulting component to be produced at the lowest possible costs in order to meet the high demand cheaply. Processes that make this possible.

A prerequisite for the good contact and adhesion of the coatings is a fine dispersion of the epoxy particles in the formulations used for the coating in each case.

SUMMARY OF THE INVENTION

The present invention relates to an epoxy dispersion suitable for coatings. In one embodiment, the dispersion comprises at least one epoxy resin and a plurality of oxidized, discrete carbon nanotubes, wherein the discrete carbon nanotubes comprise an interior and exterior surface, each surface comprising an interior surface oxidized species content and an exterior surface oxidized species content, wherein the interior surface oxidized species content differs from the exterior surface oxidized species content by at least 20%, and as high as 100% and are present in the range of from about 0.1 to about 30% by weight based on the total weight of the dispersion.

Preferably, the dispersion comprises an interior surface oxidized species content less than the exterior surface oxidized species content.

The dispersion can comprise an interior surface oxidized species content up to 3 weight percent relative to carbon nanotube weight, preferably from about 0.01 to about 3 weight percent relative to carbon nanotube weight, more preferably from about 0.01 to about 2, most preferably from about 0.01 to about 1.

The discrete carbon nanotubes of the dispersions preferably have an aspect ratio that is bimodal.

The dispersion can further comprise at least one epoxy resin diluent, preferably wherein the epoxy resin diluent is selected from the group consisting of a diglycidyl ether of cis-1,3-cyclohexanedimethanol, a diglycidyl ether of trans-1,3-cyclohexanedimethanol, a diglycidyl ether of cis-1,4-cyclohexanedimethanol, a diglycidyl ether of trans-1,4-cyclohexanedimethanol, a monoglycidyl ether of cis-1,3-cyclohexanedimethanol, a monoglycidyl ether of trans-1,3-cyclohexanedimethanol, a monoglycidyl ether of cis-1,4-cyclohexanedimethanol, a monoglycidyl ether of trans-1,4-cyclohexanedimethanol, one or more oligomers thereof, and mixtures thereof.

The dispersions can further comprise a compound comprising zinc, phosphate, chromate, phosphosilicate, borosilicate, borate, nitrate, or mixtures thereof, especially wherein the compound comprising zinc is selected from the group consisting of zinc, zinc-oxide, zinc-hydroxide, zinc-sulfide, zinc-selenide, zinc-telluride, zinc-salts, and mixtures thereof.

Preferably the compound comprising zinc is present in the range from about 0.1% to about 30% by weight based on the total weight of the dispersion.

The discrete carbon nanotubes in the dispersion can have an aspect ratio of 25 to 500.

Preferably at least 70 percent by weight of the carbon nanotubes in the dispersions are discrete.

The dispersions can further comprise at least one dispersant, preferably wherein the dispersant is selected from the group consisting of hydrophobic polymers, anionic polymers, non-ionic polymers, cationic polymers, ethylene oxide containing polymers, propylene oxide containing polymers, amphiphilic polymers, fatty acids, and mixtures thereof.

The dispersions can further comprise an additive selected from the group consisting of an epoxy resin diluent, a compound comprising zinc, a dispersant, and mixtures thereof.

Preferably at least a portion of the oxidized, discrete carbon nanotubes of the dispersions comprise an oxidation species selected from carboxylic acid or a derivative carbonyl containing species wherein the derivative carbonyl species is selected from ketones, quaternary amines, amides, esters, acyl halogens, and metal salt, preferably wherein the oxidized, discrete carbon nanotubes comprise an oxidation species selected from hydroxyl or derived from hydroxyl containing species.

The dispersions can further comprise an acrylic polymer, a silicone polymer, or a mixture thereof.

The plurality of oxidized, discrete carbon nanotubes of the dispersions preferably comprise multiwall carbon nanotubes.

The dispersions can further comprise at least one organic inhibitor selected from the group consisting of azoles, calcium alkyl-aryl sulfonates, diamines, and metal salts of dinonylnapathalene sulphonates.

Another embodiment of the invention comprises a catheter comprising the dispersions, wherein the epoxy has been at least partially cured.

Another embodiment of the inventions comprises a coating comprising the dispersions, wherein the epoxy has been at least partially cured.

Yet another embodiment of the invention is a composition comprising a plurality of discrete carbon nanotube fibers having an aspect ratio of from about 25 to about 500, and at least one natural or synthetic elastomer, and optionally at least one filler. The composition can have carbon nanotube fibers with an oxidation level of from about 3 weight percent to about 15 weight percent, or from about 0.5 weight percent up to about 4, or up to about 3, or up to 2 weight percent based on the total weight of discrete carbon nanotubes. The carbon nanotube fibers comprise preferably of about 1 weight percent to about 30 weight percent of the composition and the composition is in the form of free flowing particles or a bale. The composition is further comprising of at least one surfactant or dispersing aid. The composition can comprise the natural or synthetic elastomer selected from the group consisting of, but not limited to, natural rubbers, polyisobutylene, polybutadiene and styrene-butadiene rubber, butyl rubber, polyisoprene, styrene-isoprene rubbers, styrene-isoprene rubbers, ethylene propylene diene rubbers, silicones, polyurethanes, polyester-polyethers, hydrogenated and non-hydrogenated nitrile rubbers, halogen modified elastomers, fluoro-elastomers, and combinations thereof. The composition contains fibers that are not entangled as a mass and are uniformly dispersed in the elastomer.

In another embodiment, the invention is a process to form a carbon nanotube fiber/elastomer composite comprising the steps of: (a) selecting discrete carbon nanotube fibers having an aspect ratio of from 25 to 500, (b) blending the fibers with a liquid to form a liquid/fiber mixture, (c) optionally adjusting the pH to a desired level, (d) agitating the mixture to a degree sufficient to disperse the fibers to form a dispersed fiber mixture, (e) optionally combining the dispersed fiber mixture with at least one surfactant, (f) combining the dispersed fiber mixture with at least one elastomer at a temperature sufficient to incorporate the dispersed fiber mixture to form a carbon nanotube fiber/elastomer composite/liquid mixture, (g) isolating the resulting carbon nanotube fiber/elastomer composite from the liquid. The carbon nanotube fibers comprise from about 1 to about 30 weight percent of the fiber/elastomer composite of (g). The liquid is aqueous based. The agitating step (d) comprises sonication. In this embodiment, the elastomer is selected from, but not limited to, the natural or synthetic elastomer selected from the group consisting of, but not limited to, natural rubbers, polyisobutylene, polybutadiene and styrene-butadiene rubber, butyl rubber, polyisoprene, styrene-isoprene rubbers, styrene-isoprene rubbers, ethylene propylene diene rubbers, silicones, polyurethanes, polyester-polyethers, hydrogenated and non-hydrogenated nitrile rubbers, halogen modified elastomers, fluoro-elastomers, and combinations thereof. The composition is further comprising sufficient natural or synthetic elastomer to form a formulation comprising from about 0.1 to about 25 weight percent carbon nanotube fibers.

In another embodiment, the invention is a formulation in the form of a molded or fabricated article, such as a tire, a hose, a belt, a seal and a tank track pad, wheel, bushings or backer plate components.

In another embodiment, the invention is a nanotubes/elastomer composite further comprising of filler or fillers such as carbon black and/or silica, and wherein a molded film comprising the composition has a tensile modulus at 5 percent strain of at least about 12 MPa. The composition comprising of carbon black, and wherein a molded film comprising the composition has a tear property of at least about 0.8 MPa.

In yet another embodiment of the invention is a carbon nanotube/elastomer composition further comprising of filler, and where in a molded film comprising the composition has a tensile modulus at 5% strain of at least 8 MPa.

In yet another embodiment of the invention is a carbon nanotube fiber/elastomer composite, wherein the carbon nanotube fibers are discrete fibers and comprise from about 10 to about 20 weight percent fibers and wherein the elastomer comprises a styrene copolymer rubber.

In still another embodiment of the invention is a method for obtaining individually dispersed carbon nanotubes in rubbers and/or elastomers comprising (a) forming a solution of exfoliated carbon nanotubes at pH greater than or equal to about 7, (b) adding the solution to a rubber or elastomer latex to form a mixture at pH greater than or equal to about 7, (c) coagulating the mixture to form a concentrate, (d) optionally incorporating other fillers into the concentrate, and (e) melt-mixing said concentrate into rubbers and/or elastomers to form elastomeric composites. In this embodiment the carbon nanotubes comprise less than or equal to about 2 percent by weight of the solution. A further embodiment is that the coagulation step comprises mixing with acetone. In another embodiment, the coagulation step comprises drying the mixture. In yet another embodiment the coagulation step comprises adding at least one acid to the mixture at pH less than or equal to about 4.5 together with at least one monovalent inorganic salt. In another embodiment, the mixture has divalent or multivalent metal ion content of less than about 20,000 parts per million, preferably less than about 10,000 parts per million and most preferably less than about 1,000 parts per million.

Another aspect of this invention are coagulating methods/agents are those that enable the carbon nanotube to be non-ordered on the surface of the elastomer latex particle and together are substantially removable from the liquid mixture. A further aspect of this invention is a method to reduce or remove surfactants in the latex/carbon nanotube fiber composite system organic molecules of high water solubility such as acetone, denatured alcohol, ethyl alcohol, methanol, acetic acid, tetrahydrofuran. Another aspect of this invention is to select coagulating methods that retain surfactant in the latex/carbon nanotube fiber material which includes coagulating methods such as sulfuric acid and inorganic monovalent element salt mixtures, acetic acid and monovalent element salt mixtures, formic acid and inorganic monovalent element salt mixtures, air drying, air spraying, steam stripping and high speed mechanical agitation.

For a more complete understanding of the present disclosure, and the advantages thereof, reference is now made to the following descriptions describing specific embodiments of the disclosure.

DETAILED DESCRIPTION OF THE INVENTION

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification or if the incorporation is necessary for maintaining validity.

Functionalized carbon nanotubes of the present disclosure generally refer to the chemical modification of any of the carbon nanotube types described hereinabove. Such modifications can involve the nanotube ends, sidewalls, or both. Chemical modifications may include, but are not limited to covalent bonding, ionic bonding, chemisorption, intercalation, surfactant interactions, polymer wrapping, cutting, solvation, and combinations thereof. In some embodiments, the carbon nanotubes may be functionalized before, during and after being exfoliated.

In various embodiments, a plurality of carbon nanotubes is disclosed comprising single wall, double wall or multi wall carbon nanotube fibers having an aspect ratio of from about 25 to about 500, preferably from about 60 to about 200, and a oxidation level of from about 3 weight percent to about 15 weight percent, preferably from about 5 weight percent to about 10 weight percent. The oxidation level is defined as the amount by weight of oxygenated species covalently bound to the carbon nanotube. The thermogravimetric method for the determination of the percent weight of oxygenated species on the carbon nanotube involves taking about 5 mg of the dried oxidized carbon nanotube and heating at 5° C./minute from room temperature to 1000 degrees centigrade in a dry nitrogen atmosphere. The percentage weight loss from 200 to 600 degrees centigrade is taken as the percent weight loss of oxygenated species. The oxygenated species can also be quantified using Fourier transform infra-red spectroscopy, FTIR, particularly in the wavelength range 1730-1680 cm$^{-1}$.

The carbon nanotube fibers can have oxidation species comprising of carboxylic acid or derivative carbonyl containing species and are essentially discrete individual fibers, not entangled as a mass. The derivative carbonyl species can include ketones, quaternary amines, amides, esters, acyl halogens, monovalent metal salts and the like. Alternatively or in addition, the carbon nanotubes may comprise an oxidation species selected from hydroxyl or derived from hydroxyl containing species.

As-made carbon nanotubes using metal catalysts such as iron, aluminum or cobalt can retain a significant amount of the catalyst associated or entrapped within the carbon nanotube, as much as five weight percent or more. These residual metals can be deleterious in such applications as electronic devices because of enhanced corrosion or can interfere with the vulcanization process in curing elastomer composites. Furthermore, these divalent or multivalent metal ions can associate with carboxylic acid groups on the carbon nanotube and interfere with the discretization of the carbon nanotubes in subsequent dispersion processes. In other embodiments, the oxidized fibers comprise a residual metal concentration of less than about 10000 parts per million, ppm, and preferably less than about 1000 parts per million. The metals can be conveniently determined using energy dispersive X-ray, EDX.

In another embodiment, a mixture of master batches using different rubbers added to blends of different rubbers used in the rubber compound such that each rubber has a master batch that is compatible so that the individually dispersed nanotubes are distributed whether uniformly or non-uniformly in each rubber domain. This is sometimes necessary so that blends of rubbers used in the rubber compound will have carbon nanotubes in each rubber component.

An illustrative process for producing discrete oxidized carbon nanotubes follows: 3 liters of sulfuric acid, 97 percent sulfuric acid and 3 percent water, and 1 liter of concentrated nitric acid containing 70 percent nitric acid and 3 percent water, are added into a 10 liter temperature controlled reaction vessel fitted with a sonicator and stirrer. 40 grams of non-discrete carbon nanotubes, grade Flowtube 9000 from CNano corporation, are loaded into the reactor vessel while stirring the acid mixture and the temperature maintained at 30° C. The sonicator power is set at 130-150 watts and the reaction is continued for three hours. After 3 hours the viscous solution is transferred to a filter with a 5 micron filter mesh and much of the acid mixture removed by filtering using a 100 psi pressure. The filter cake is washed one times with four liters of deionized water followed by one wash of four liters of an ammonium hydroxide solution at pH greater than 9 and then two more washes with four liters of deionized water. The resultant pH of the final wash is 4.5. A small sample of the filter cake is dried in vacuum at 100°

C. for four hours and a thermogravimetric analysis taken as described previously. The amount of oxidized species on the fiber is 8 percent weight and the average aspect ratio as determined by scanning electron microscopy to be 60.

The discrete oxidized carbon nanotubes (CNT) in wet form are added to water to form a concentration by weight of 1 percent and the pH is adjusted to 9 using ammonium hydroxide. Sodium dodecylbenzene sulfonic acid and is added at a concentration 1.25 times the mass of oxidized carbon nanotubes. The solution is sonicated while stirring until the CNT are fully dispersed in the solution. Full dispersion of individual tubes is defined when the UV absorption at 500 nm is above 1.2 absorption units for a concentration of $2.5 \times 10^{-5}$ g CNT/ml. Latex SBR LPF 5356 (Goodyear Rubber Company) with a solids SBR concentration of 70.2% (by weight) was added to the CNT solution such that the solids ratio is 10 parts CNT for 90 parts SBR by weight.

Sulfuric acid is then added sufficient to bring the pH to 2 and sodium chloride added at a ratio of 50 g/liter of fluid while stirring. Stirring continues for 10 minutes then the coagulant is removed by filtering. The filtrate is a clear liquid. The coagulant is dried in a vacuum oven at 40° C. overnight.

As used herein, the singular terms "a" and "the" are synonymous and used interchangeably with "one or more" and "at least one," unless the language and/or context clearly indicates otherwise. Accordingly, for example, reference to "a polymeric dispersing agent" herein or in the appended claims can refer to a single polymeric dispersing agent or more than one polymeric dispersing agent. Additionally, all numerical values, unless otherwise specifically noted, are understood to be modified by the word "about."

The discrete carbon nanotubes may be present in the dispersion according to the invention in treated or untreated form. If they are treated, they have preferably been previously treated with an oxidizing agent. The oxidizing agent is preferably nitric acid and/or sulfuric acid.

A composition with discrete carbon nanotubes which have a length to external diameter ratio of more than 5, preferably more than 100, is preferred.

The discrete carbon nanotubes, especially multiwall carbon nanotubes, used preferably have an average external diameter in this case of 3 to 100 nm, particularly preferably of 5 to 80 nm, most particularly preferably of 6 to 20 nm.

A small proportion of the smallest possible agglomerates is advantageous, because as a result of this, the physical properties of viscosity and conductivity of the dispersion, as well as its processability when used according to the invention, are improved. Coarse and numerous agglomerates may in certain circumstances lead to clogging of the coating equipment during application. In addition, coarse and numerous agglomerates may lead to areas of the coating that may be thinner or thicker in depth.

A smaller proportion of carbon nanotubes leads to the resulting epoxy coating being too low-viscosity and thus possibly no longer suitable for high throughput processes. A higher proportion of carbon nanotubes also increases the viscosity beyond the level that would still appear meaningful for the coating to be used.

The at least one polymeric dispersing agent is generally at least one agent selected from the series of: water-soluble homopolymers, water-soluble random copolymers, water-soluble block copolymers, water-soluble graft polymers, particularly polyvinyl alcohols, copolymers of polyvinyl alcohols and polyvinyl acetates, polyvinyl pyrrolidones, cellulose derivatives such as e.g. carboxymethyl cellulose, carboxypropyl cellulose, carboxymethyl propyl cellulose, hydroxyethyl cellulose, starch, gelatine, gelatine derivatives, amino acid polymers, polylysine, polyaspartic acid, polyacrylates, polyethylene sulfonates, polystyrene sulfonates, polymethacrylates, polysulfonic acids, condensation products of aromatic sulfonic acids with formaldehyde, naphthalene sulfonates, lignin sulfonates, copolymers of acrylic monomers, polyethyleneimines, polyvinylamines, polyallylamines, poly(2-vinylpyridines), block copolyethers, block copolyethers with polystyrene blocks and polydiallyldimethylammonium chloride.

The at least one polymeric dispersing agent can be at least one agent selected from the series of: polyvinyl pyrrolidone, block copolyethers and block copolyethers with polystyrene blocks, carboxymethyl cellulose, carboxypropyl cellulose, carboxymethyl propyl cellulose, gelatine, gelatine derivatives and polysulfonic acids.

Most particularly preferably, polyvinyl pyrrolidone and/or block copolyethers with polystyrene blocks are used as polymeric dispersing agents. Particularly suitable polyvinyl pyrrolidone has a molecular weight Mn in the range of 5000 to 400,000. Suitable examples are PVP K15 from Fluka (molecular weight about 10000 amu) or PVP K90 from Fluka (molecular weight of about 360000 amu) or block copolyethers with polystyrene blocks, with 62 wt. % C2 polyether, 23 wt. % C3 polyether and 15 wt. % polystyrene, based on the dried dispersing agent, with a ratio of the block lengths of C2 polyether to C3 polyether of 7:2 units (e.g. Disperbyk 190 from BYK-Chemie, Wesel).

The at least one polymeric dispersing agent is preferably present in a proportion of 0.01 wt. % to 10 wt. %, preferably in a proportion of 0.1 wt. % to 7 wt. %, particularly preferably in a proportion of 0.5 wt. % to 5 wt. %.

The generally used and preferred polymeric dispersing agents are advantageous particularly in the proportions stated since, in addition to supporting a suitable dispersing of the carbon nanotubes, they also allow an adjustment of the viscosity of the coating according to the invention as well as an adjustment of surface tension and film formation and adhesion of the coating to the respective substrate.

This viscosity of the coating makes them particularly suitable for use in high throughput processes.

The at least one conductive salt in this case is preferably selected from the list of salts with the cations: tetraalkylammonium, pyridinium, imidazolium, tetraalkylphosphonium, and as anions various ions from simple halide via more complex inorganic ions such as tetrafluoroborates to large organic ions such as trifluoromethanesulfonimide are employed.

The adding of at least one conductive salt to the coatings according to the invention is advantageous because these salts possess a negligible vapour pressure. Thus, the salt is available as a film-forming agent and a conductive agent even at elevated temperatures and under reduced pressure. Particularly in the context of the coating process taking place, it may therefore be possible to prevent the coating from running.

In another development of the novel coating, the coating may additionally comprise a proportion of carbon black together with the proportions of carbon nanotubes and polymeric dispersing agent.

In connection with the present invention, carbon black refers to fine particles of elemental carbon in graphite or amorphous form. Fine particles in this context are particles with an average diameter of less than or equal to 1 μm.

If according to the development carbon black is added to the coating according to the invention, this is preferably carbon black as obtainable from EVONIC under the name Printex®PE.

The addition of a proportion of carbon black to the coating can be advantageous because with only a slight further increase in viscosity, the conductivity of the coating to be obtained can be increased further in that potential voids between the carbon nanotubes are filled with carbon black, as a result of which the conductive connection between the carbon nanotubes is established and thus the conductive cross section of the coating is increased.

The present invention also provides a process for the preparation of a composition for the production of conductive coatings based on discrete carbon nanotubes, epoxy, and at least one polymeric dispersing agent in an aqueous formulation, particularly of a printable composition according to the invention, characterized in that it comprises at least the following steps:

a) optional oxidative pretreatment of the discrete carbon nanotubes,
b) preparation of an aqueous pre-dispersion by dissolving the polymeric dispersing agent in an aqueous solvent, and the input and distribution of carbon nanotubes in the resulting solution,
c) input of a volume-based energy density, preferably in the form of shear energy, of at least $10^4$ J/m$^3$, preferably of at least $10^5$ J/m$^3$, particularly preferably $10^7$ to $10^9$ J/m$^3$ into the pre-dispersion until the agglomerate diameter of the carbon nanotube agglomerates is substantially ≤5 μm, preferably ≤3 μm, particularly preferably ≤2 μm.

Should a pretreatment of the discrete carbon nanotubes, according to step a) of the process according to the invention, take place, which is preferred, the pretreatment generally takes place by treating with an oxidizing agent.

The pretreatment with an oxidizing agent advantageously takes place preferably in that the carbon nanotubes are dispersed in a 5 to 10 wt. % aqueous solution of the oxidizing agent, and then the carbon nanotubes are separated out of the oxidizing agent and subsequently dried. The dispersing in an oxidizing agent generally takes place for a period of one to 12 h. The carbon nanotubes are preferably dispersed in the oxidizing agent for a period of 2 h to 6 h, particularly for about 4 h. The separation of discrete carbon nanotubes from the oxidizing agent generally takes place by sedimentation. The separation preferably takes place by sedimentation under the earth's gravity or by sedimentation in a centrifuge. The drying of the carbon nanotubes generally takes place in ambient air and at temperature of 60° C. to 140° C., preferably at temperatures of 80° C. to 100° C.

The oxidizing agent is generally nitric acid and/or sulfuric acid; the oxidizing agent is preferably nitric acid. The oxidizer can also be hydrogen peroxide.

The preparation of the aqueous pre-dispersion according to step b) of the novel process advantageously takes place by dissolving the at least one polymeric dispersing agent in an initial charge of water, and then adding carbon nanotubes.

According to a preferred development of the invention, organic solvents, preferably selected from the series of: $C_1$ to $C_5$ alcohol, particularly $C_1$ to $C_3$ alcohol, ethers, particularly dioxalane, and ketones, particularly acetone, may also be added to the water.

According to a preferred development of the novel coating, it is also possible to add carbon black and/or conductive salts in the context of step b) of the novel process.

The addition of discrete carbon nanotubes can take place together with the at least one polymeric dispersing agent or consecutively. Preferably the at least one polymeric dispersing agent is added first and then the carbon nanotubes are added in batches. Particularly preferably the addition of the at least one dispersing agent and then the addition of the carbon nanotubes in batches take place with stirring and/or with ultrasound treatment.

If, according to the preferred developments of the novel coating dispersions, this dispersive coating comprises conductive salts and/or carbon black, the carbon black is preferably added together with the carbon nanotubes in the same way and/or the conductive salts are added together with the at least one polymeric dispersing agent in the same way.

The consecutive and batchwise addition of carbon nanotubes with stirring and/or ultrasound for the preparation of the pre-dispersion is particularly advantageous, since this allows an improvement in the dispersing of the carbon nanotubes to achieve the finished dispersion, in which the carbon nanotubes are present in a form that is stable towards sedimentation and thus the input of energy into the pre-dispersion needed according to step c) of the process according to the invention can be reduced.

According to a preferred development of step b) of the process according to the invention, after the addition of at least one polymeric dispersing agent and the addition of carbon nanotubes, at least one conductive salt is also added.

In another embodiment, preferably after oxidation but before shear induced separation, a slurry of oxidized carbon nanotubes with concentrations from 0.5% to 3% is acidified with a strong acid to an acid concentration from 1% to 100%. Typical pH of the water wash is less than 4, preferably less than 1 and especially about 0.5. Acids can include, nitric, hydrochloric, sulfuric, and mixtures thereof. The liquid phase of the slurry is removed by filtration, centrification or other conventional solid/liquid separation technology. The subsequent filter cake is then washed with an acid at a concentration from 1% to 100. Acids can include, nitric, hydrochloric, sulfuric, and mixtures thereof. This is followed by a water washing until the acid is removed and liquid phase removal by conventional solid/liquid separation technology. A slurry of oxidized carbon nanotubes with concentrations from 0.5% to 3% is acidified with a strong acid to an acid concentration from 1% to 100%. Typical iron content starts at about 8000 ppm and is reduced by at least 70%, preferably 85%, more preferably 95% and especially 99%.

The input of the volume-based energy density, e.g. in the form of shear energy, into the pre-dispersion according to step c) of the novel process particularly preferably takes place by passing the pre-dispersion at least once through a homogenizer. In this process, the volume-based energy density can be introduced into the pre-dispersion e.g. in the area of the nozzle orifice. All embodiments known to the person skilled in the art, such as e.g. high pressure homogenizers, are suitable as homogenizers. Particularly suitable high-pressure homogenizers are known in principle e.g. from the document Chemie Ingenieur Technik, Volume 77, Issue 3 (pp. 258-262). Particularly preferred homogenizers are high-pressure homogenizers; most particularly preferred high-pressure homogenizers are jet dispersers, gap homogenizers and high-pressure homogenizers of the Microfluidizer® type.

The pre-dispersion is preferably passed at least twice through a homogenizer, preferably a high-pressure homogenizer. Particularly preferably the pre-dispersion is passed at least three times through a homogenizer, preferably a high-pressure homogenizer.

The multiple passes through a homogenizer, preferably a high-pressure homogenizer, are advantageous because any coarse agglomerates of the carbon nanotubes remaining are comminuted by this process, as a result of which the dispersion is improved in its physical properties, such as e.g. viscosity and conductivity. By adjusting the input pressure and the automatically resulting adjustment of the gap width of the homogenizer, the maximum size of any agglomerates remaining can be influenced in a targeted manner.

This economic optimum is achieved when less than 15 number % of the carbon nanotubes of the ink are still present as agglomerates of ≤10 μm, which approximately corresponds to three passes of the pre-dispersion through the homogenizer, preferably the high-pressure homogenizer.

The homogenizer, preferably the high-pressure homogenizer, is generally a jet disperser or a gap homogenizer, which is operated with an input pressure of at least 50 bar and an automatically adjusted gap width.

The homogenizer, preferably the high-pressure homogenizer, is preferably operated with an input pressure of 1000 bar and an automatically adjusted gap width. Most particularly preferred are high-pressure homogenizers of the Micronlab type.

The alternative, equally preferred embodiment of steps b) and c) of the novel process provides the treatment of the pre-dispersion in a triple roll mill.

The preferred process is characterized in that the preparation of the pre-dispersion b) and the input of shear energy c) take place by a treatment of the pre-dispersion in a triple roll mill with rotating rolls, the process comprising at least the following steps:

b1) introduction of the solution of the polymeric dispersing agent in the aqueous solvent together with the carbon nanotubes into a first gap between a first and a second roll with different rates of rotation, wherein the carbon nanotubes are pre-dispersed in the solution and coarse agglomerates are comminuted;

b2) transport of the pre-dispersion from step b1) to a second gap between the second roll and a third roll with a different rate of rotation, the pre-dispersion at least partly adhering to the roll surface during transport;

c1) introduction of the pre-dispersion into the second gap, wherein the agglomerates of the carbon nanotubes in the dispersion are comminuted to a diameter of substantially ≤5 μm, preferably ≤3 μm, particularly preferably ≤2 μm;

c2) removal of the finished dispersion from the roll surface of the third roll.

The alternative embodiment of the process according to the invention is preferably operated in such a way that the ratio of the rate of rotation of the first roll and the second roll and the ratio of the rate of rotation of the second roll and the third roll are, independently of one another, at least 1:2, preferably at least 1:3.

The width of the gap between the first and second roll and between the second and third roll may be the same or different. The gap width is preferably the same. The gap width is particularly preferably the same and less than 10 μm, preferably less than 5 μm, particularly preferably less than 3 μm.

It is particularly advantageous to carry out the alternative steps b) and c) of the novel process because, as a result of the different rates of rotation of the rolls of the same diameter, high shear rates are achieved in the first and second gaps, which permit good dispersion of the carbon nanotubes. Particularly in combination with the preferred equal, small gap widths, the result is very advantageous. By means of the alternative embodiment of step c), it is possible to obtain dispersions with small proportions of agglomerates and small agglomerate sizes. In preferred embodiments, the adjustment of the gap in the homogenizer, preferably the high-pressure homogenizer, is regulated by the adjustment of the input pressure such that this is comparable to the adjustment of the gap between the rolls in the triple roll mill. In preferred embodiments, the passage through the two gaps in the triple roll mill can approximately correspond to two passes in the homogenizer, preferably the high-pressure homogenizer.

The dispersions according to the invention obtained according to the process according to the invention and its preferred and alternative embodiments are particularly suitable for use e.g. in screen printing, offset printing or similar, generally known, high throughput processes for the production of conductive printed images.

The invention also provides an electrically conductive coating obtainable by printing, particularly by means of screen printing or offset printing of the composition according to the invention on to a surface and removal of the solvent or solvents.

The invention also provides an object with surfaces of non-conductive or poorly conductive material (surface resistance of less than 104 Ohm·m) exhibiting a coating obtainable from the composition according to the invention.

In a development of the use of the dispersion according to the invention, the conductive printed image of the dispersion can optionally be thermally post-treated.

The thermal post-treatment of the printed dispersion takes place in the context of its use preferably by drying at a temperature from room temperature (23° C.) to 150° C., preferably 30° C. to 140° C., particularly preferably 40° C. to 80° C.

A thermal post-treatment is advantageous if the adhesion of the dispersion according to the invention to the substrate can be improved thereby and the printed dispersion can thereby be secured against slurring.

In addition to the good conductivity of the printed images of the dispersions according to the invention and their preferred developments, the novel dispersions also possess other properties which may be advantageous for other applications.

For example, it is generally known that the group of substances of the carbon nanotubes and also the special carbon nanotubes used according to the invention have particularly high strength. It is therefore conceivable using the dispersion according to the invention, by applying the same on to a surface, to transfer the positive mechanical properties of the special carbon nanotubes on to the surface, at least in part.

Discrete oxidized carbon nanotubes, alternatively termed exfoliated carbon nanotubes, are obtained from as-made bundled carbon nanotubes by methods such as oxidation using a combination of concentrated sulfuric and nitric acids. The techniques disclosed in PCT/US09/68781, the disclosure of which is incorporated herein by reference, are particularly useful in producing the discrete carbon nanotubes used in this invention. The bundled carbon nanotubes can be made from any known means such as, for example, chemical vapor deposition, laser ablation, and high pressure carbon monoxide synthesis. The bundled carbon nanotubes can be present in a variety of forms including, for example, soot, powder, fibers, and bucky paper. Furthermore, the bundled carbon nanotubes may be of any length, diameter, or chirality. Carbon nanotubes may be metallic, semi-metallic, semi-conducting, or non-metallic based on their chirality and number of walls. The discrete oxidized carbon nanotubes may include, for example, single-wall, double-wall carbon nanotubes, or multi-wall carbon nanotubes and combinations thereof.

During the process of making discrete or exfoliated carbon nanotubes (which can be single, double and multi-wall configurations), the nanotubes are cut into segments, preferably with at least one open end, and residual catalyst particles that are interior to the carbon nanotubes as received from the manufacturer are removed at least partially. This cutting of the tubes helps with exfoliation. The cutting of the tubes reduces the length of the tubes into carbon nanotube segments that are defined here as Molecular Rebar. Proper selection of the carbon nanotube feed stock related to catalyst particle type and distribution in the carbon nanotubes allows more control over the resulting individual tube lengths and overall tube length distribution. A preferred selection is where the internal catalyst sites are evenly spaced and where the catalyst is most efficient. The preferred aspect ratio (length to diameter ratio) is greater than about 25 and less than about 200 for a balance of viscosity and mechanical performance. Preferably, substantially all of the discrete carbon nanotubes tube ends are open ended after the MR conversion process. The selection can be evaluated using electron microscopy and determination of the discrete tube distribution.

Molecular Rebar has oxidized moieties on the surface. Oxidized moieties include, but are not limited to, carboxylates, hydroxyls, ketones and lactones. The oxidized species can react advantageously with species such as, but not limiting in scope to, an acyl halide, epoxy, isocyanate, hydroxyl, carboxylic acid, or amine group. This reaction may increase the stability of the dispersion of MR in the fluid. The weight fraction of oxidized moieties is determined from the weight loss in the temperature range 200 to 600° C. using a therogravimetric analyzer in nitrogen run at 5° C./minute.

The residual catalyst in the Molecular Rebar is determined by heating the Molecular Rebar to 800° C. in air for 30 minutes using a thermogravimetric analyzer.

TABLE 1

| | Lengths (nm) | | |
|---|---|---|---|
| | Condition 1 | Condition 2 | Condition 3 |
| Mean | 424 | 487 | 721 |
| Standard Error | 25.3 | 34.9 | 50 |
| Median | 407 | 417.0 | 672 |
| Standard Deviation | 177 | 281 | 315 |
| Sample Variance | 31461 | 79108 | 99418 |
| Kurtosis | −0.83 | 1.5 | −0.02 |
| Skewness | 0.03 | 1.2 | 0.64 |
| Range | 650 | 1270.0 | 1364 |
| Minimum | 85 | 85.0 | 161 |
| Maximum | 735 | 1355 | 1525 |

Condition 1 is an example of a narrow distribution with low mean length.
Condition 2 is an example of broad distribution with low mean length.
Condition 3 is an example of high mean length and broad distribution.

Additives can be included and can further react or be completely inert with other components of the formulation. Fibrous additives can be surface active to react with surroundings. To determine tube lengths, a sample of tubes is diluted in isopropyl alcohol and sonicated for 30 minutes. It is then deposited onto a silica wafer and images are taken at 15 kV and 20,000× magnification by SEM. Three images are taken at different locations. Utilizing the JEOL software (included with the SEM) a minimum of 2 lines are drawn across on each image and measure the length of tubes that intersect this line.

Skewness is a measure of the asymmetry of a probability distribution. A positive value means the tail on the right side of the distribution histogram is longer than the left side and vice versa. Positive skewness is preferred for the nanotubes of the present invention, which indicates more tubes of long lengths. A value of zero means a relatively even distribution on both sides of the mean value. Kurtosis is the measure of the shape of the distribution curve and is generally relative to a normal distribution. Both skewness and kurtosis are unitless.

The following table shows representative values of discrete carbon nanotubes diameters:

TABLE 2

| Diameter (unrelated to condition above) | | | |
|---|---|---|---|
| Mean diameter (nm*) | 12.5 | | |
| Median diameter (nm) | 11.5 | | |
| Kurtosis | 3.6 | | |
| Skewness | 1.8 | | |
| Calculated aspect ratio (L/D) | 34 | 39 | 58 |

*nm = nanometer

Functionalized carbon nanotubes of the present disclosure generally refer to the chemical modification of any of the carbon nanotube types described hereinabove. Such modifications can involve the nanotube ends, sidewalls, or both. Chemical modifications may include, but are not limited to covalent bonding, ionic bonding, chemisorption, intercalation, surfactant interactions, polymer wrapping, cutting, solvation, and combinations thereof.

Materials comprising DCNT can have other additives such as other fibers (carbon, graphite, graphene, polymeric (polypropylene, polyethylene to name just a couple), and particulates (such as powders (carbon black), sand, diatomaceous earth, cellulose, colloids, agglomerates, antimicrobials and inorganic salts).

The DCNT molecular rebar (MR) can comprise 0.01 to 90% by weight of the formulation, preferably 0.1 to 50, more preferably 0.25 to 25% by weight of the formulation.

Based on the desired application (such as reinforcing foam articles), 10% by weight or less of the discrete carbon nanotubes MR of the formulation can comprise L/D of about 100 to 200 and about 30% or more of the discrete carbon nanotubes MR of the formulation can comprise L/D of 40 to 80. The L/D of the discrete carbon nanotubes can be a unimodal distribution, or a multimodal distribution (such as a bimodal distribution). The multimodal distributions can have evenly distributed ranges of aspect ratios (such as 50% of one L/D range and about 50% of another L/D range). The distributions can also be asymmetrical—meaning that a relatively small percent of discrete nanotubes can have a specific L/D while a greater amount can comprise another aspect ratio distribution.

For the dispersions according to the invention, the possibility thus arises of exposing the printed images obtained to further mechanical loads in the form of deforming stress (e.g. by thermoforming, if the surface consists of a polymer material), without the carbon nanotubes losing contact with one another and thus the printed images losing conductivity, as the carbon nanotubes align themselves along the direction of stress.

OTHER EMBODIMENTS

1. A dispersion composition comprising a plurality of oxidized, discrete carbon nanotube fibers having an aspect ratio of from about 25 to about 500, and at least one natural or synthetic elastomer, and optionally at least one filler.
2. The composition of embodiment 1 wherein at least 70 percent, preferably at least 80 percent, by weight of the nanotube fibers are fully exfoliated.
3. The composition of embodiment 1 wherein the nanotube fibers are further functionalized.
4. The composition of embodiment 1 wherein the carbon nanotube fibers comprise an oxidation level from about 3 weight percent to about 15 weight percent.
5. The composition of embodiment 1 wherein the carbon nanotube fibers comprise from about 1 weight percent to about 30 weight percent of the composition.
6. The composition of embodiment 1 in the form of free flowing particles.
7. The composition of embodiment 1 further comprising at least one surfactant or dispersing aid.
8. The composition of embodiment 1 wherein the natural or synthetic elastomer is selected from the group consisting of natural rubbers, polyisobutylene, polybutadiene and styrene-butadiene, butyl rubber, polyisoprene, ethylene propylene diene rubbers and hydrogenated and non-hydrogenated nitrile rubbers, polyurethanes, polyethers, silicones, halogen modified elastomers, especially chloroprene and fluoroelastomers and combinations thereof.
9. The composition of embodiment 1 wherein the fibers are not entangled as a mass.
10. A process to form a carbon nanotube fiber/elastomer composite comprising the steps of:
    (a) selecting discrete carbon nanotube fibers having an aspect ratio of from 25 to 500,
    (b) blending the fibers with a liquid to form a liquid/fiber mixture,
    (c) optionally adjusting the pH to a desired level,
    (d) agitating the mixture to a degree sufficient to disperse the fibers to form a dispersed fiber mixture,
    (e) optionally combining the dispersed fiber mixture with at least one surfactant,
    (f) combining the dispersed fiber mixture with at least one elastomer at a temperature sufficient to incorporate the dispersed fiber mixture to form a carbon nanotube fiber/elastomer composite/liquid mixture,
    (g) isolating the resulting carbon nanotube fiber/elastomer composite from the liquid.
11. The process of embodiment 10 wherein the carbon nanotube fibers comprise from about 1 to about 30 weight percent of the fiber/elastomer composite of (g).
12. The process of embodiment 10 wherein the liquid is aqueous based.
13. The process of embodiment 10 wherein the agitating step (d) comprises sonication.
14. The process of embodiment 10 wherein the elastomer is selected from the group consisting of natural rubbers, polyisobutylene, polybutadiene and styrene-butadiene rubber, ethylene propylene diene rubbers, butyl rubber, polyisoprene and hydrogenated and non-hydrogenated nitrile rubbers, polyurethanes, polyethers, halogen containing elastomers and fluoroelastomers and combinations thereof.
15. The composition of embodiment 1 further comprising sufficient natural or synthetic elastomer to form a formulation comprising from about 0.1 to about 25 weight percent carbon nanotube fibers.
16. The composition of embodiment 1 in the form of a molded or fabricated article, such as a tire, a hose, a belt, a seal and a tank track.
17. The composition of embodiment 1 further comprising carbon black and/or silica and wherein a molded film comprising the composition has a tensile modulus at 5% strain and 25 degrees C. of at least about 12 MPa.
18. The composition of embodiment 1 further comprising carbon black and/or silica, and wherein a molded film comprising the composition has a tear property at 25 degrees C. of at least about 0.8 MPa.
19. The composition of embodiment 1 further comprising filler, and wherein a molded film comprising the composition has a tensile modulus at 5% strain and 25 degrees C. of at least about 8 MPa.
20. A carbon nanotube fiber/elastomer composite, wherein the carbon nanotube fibers are discrete fibers and comprise from about 10 to about 20 weight percent fibers and wherein the elastomer comprises a styrene copolymer rubber.
21. A method for obtaining individually dispersed carbon nanotubes in rubbers and/or elastomers comprising (a) forming a solution of exfoliated carbon nanotubes at pH greater than or equal to about 7, (b) adding the solution to a rubber or elastomer latex to form a mixture at pH greater than or equal to about 7, (c) coagulating the mixture to form a concentrate, (d) optionally incorporating other fillers into the concentrate, and (e) melt-mixing said concentrate into rubbers and/or elastomers to form elastomeric composites.
22. The method of embodiment 21 wherein the carbon nanotubes comprise less than or equal to about 2% wt of the solution.
23. The method of embodiment 21 wherein the coagulation step (c) comprises mixing with organic molecules of high water solubility such as acetone, denatured alcohol, ethyl alcohol, methanol, acetic acid, tetrahydrofuran that partially or wholly removes surfactants form the latex/carbon nanotube fiber concentrate.
24. The method of embodiment 21 wherein the coagulation step (c) comprises drying, steam stripping or mechanical agitation of the mixture to fully retain surfactants from the latex/carbon nanotube fiber concentrate.
25. The method of embodiment 21 wherein the coagulation step (c) comprises adding a polymeric coagulating agent, preferably polyethylene oxide.
26. The method of embodiment 21 wherein the coagulation step (c) comprises adding at least one acid to the mixture at pH less than or equal to about 4.5 together with at least one monovalent inorganic salt to retain surfactants from the latex/carbon nanotube fiber concentrate.
27. The method of embodiment 21 wherein the mixture or concentrate has a divalent or multivalent metal ion content of less than about 20,000 parts per million.
28. The method of embodiment 21 wherein the mixture or concentrate has a divalent or multivalent metal ion content of less than about 10,000 parts per million.
29. The method of embodiment 21 wherein the mixture or concentrate has a divalent or multivalent metal ion content of less than about 1,000 parts per million.
30. The method of embodiment 21 wherein the coagulation step (c) is such that agglomerations of carbon nanotubes comprise less than 1 percent weight of the concentrate and wherein the carbon nanotube agglomerates comprise more than 10 microns in diameter.
31. An individually dispersed carbon nanotube/rubber or carbon nanotube/elastomer concentrate comprising free flowing particles wherein the concentrate contains a concentration of less than 20,000 parts per million divalent or multivalent metal salt.
32. An individually dispersed carbon nanotube/rubber or carbon nanotube/elastomer concentrate comprising free flowing particles wherein the concentrate contains agglomerations of carbon nanotubes that comprise less than 1 percent by weight of the concentrate and wherein the carbon nanotube agglomerates comprise more than 10 micrometers in diameter.
33. A composite comprising the concentrate of embodiments 31 or 32.
34. A method of dispersing the individually dispersed carbon nanotube/rubber or carbon nanotube/elastomer concentrate into an elastomer by first melt mixing the elastomer and concentrate to a uniform consistency before addition of other fillers and oils.
35. The composition of embodiment 5 comprising a mixture of natural and synthetic elastomers such that each elastomer is compatible with at least one of the elastomers such that the nanotubes are individually dispersed in the mixture of elastomer(s).
36. The composition of embodiment 35 wherein at least one of the elastomers does not comprise nanotubes.
37. A composition comprising one first elastomer and nanotubes, another different second elastomer and nanotubes, and yet another third elastomer which does not comprise nanotubes.
38. A process to increase cure rate of a composition comprising at least one natural or synthetic elastomer and carbon nanotubes, comprising selecting discrete carbon nanotubes to form the cured composition, wherein the cured composition has at least a 25 percent curing rate increase over the curing rate obtained for a cured elastomer not comprising carbon nanotubes.
39. A composition of (A) elastomers, fillers and discrete carbon nanotubes wherein to maintain or increase stiffness or hardness as compared to (B) a composition not containing discrete carbon nanotubes, wherein composition (A) has less filler content than (B).
40. A composition of embodiment 39 wherein 1× parts per hundred elastomer discrete carbon nanotube of composition (A) replaces 5× parts per hundred elastomer or more of the non-carbon nanotube filler of composition (B), where x is 0.1-15.
41. A method of mixing carbon nanotubes and at least one first elastomer, wherein a master batch of carbon nanotubes is first melt mixed with the elastomer, either the same or different from the first elastomer, at a temperature from about 20 to about 200° C., subsequently then additional elastomers, fillers, and additives are added and melt mixed further, to produce a composition suitable for vulcanization.
42. A method of mixing carbon nanotubes and at least one first elastomer, wherein a master batch of carbon nanotubes is first mixed with the elastomer, either the same or different from the first elastomer, at a temperature from about 20 to about 200° C. and in the presence of at least one solvent, then the at least one solvent is removed, subsequently and optionally additional elastomers, fillers and additives are added and mixed further to produce a composition suitable for vulcanization.
43. A method of mixing carbon nanotubes and at least one first elastomer, wherein a master batch of carbon nanotubes is first mixed with the elastomer, either the same or different from the first elastomer, at a temperature from about 20 to about 200° C. and in the presence of at least one solvent, subsequently and optionally additional elastomers, fillers and additives are added and mixed further, followed by solvent removal to produce a composition suitable for vulcanization.

The invention claimed is:
1. A dispersion comprising at least one epoxy resin and a plurality of oxidized, discrete carbon nanotubes, wherein the discrete carbon nanotubes comprise an interior and exterior surface, each surface comprising a weight of an interior surface oxidized species content and a weight of an exterior surface oxidized species content, wherein the weight of the interior surface oxidized species content differs from the weight of the exterior surface oxidized species content by at least 20%, and as high as 100% and wherein the plurality of oxidized, discrete carbon nanotubes are present in the range of from about 0.1 to about 30% by weight based on the total weight of the dispersion.
2. The dispersion of claim 1 wherein the interior surface oxidized species content is less than the exterior surface oxidized species content.
3. The dispersion of claim 1 wherein the interior surface oxidized species content is up to 3 weight percent relative to carbon nanotube weight.
4. The dispersion of claim 1 wherein the discrete carbon nanotubes have an aspect ratio that is bimodal.
5. The dispersion of claim 1, further comprising at least one epoxy resin diluent.
6. The dispersion of claim 5, wherein the epoxy resin diluent is selected from the group consisting of a diglycidyl ether of cis-1,3-cyclohexanedimethanol, a diglycidyl ether of trans-1,3-cyclohexanedimethanol, a diglycidyl ether of cis-1,4-cyclohexanedimethanol, a diglycidyl ether of trans-1,4-cyclohexanedimethanol, a monoglycidyl ether of cis-1,3-cyclohexanedimethanol, a monoglycidyl ether of trans-1,3-cyclohexanedimethanol, a monoglycidyl ether of cis-1,4-cyclohexanedimethanol, a monoglycidyl ether of trans-1,4-cyclohexanedimethanol, one or more oligomers thereof, and mixtures thereof.
7. The dispersion of claim 1, further comprising a compound comprising zinc, phosphate, chromate, phosphosilicate, borosilicate, borate, nitrate, or mixtures thereof.
8. The dispersion of claim 7, wherein the compound comprising zinc is selected from the group consisting of zinc, zinc-oxide, zinc-hydroxide, zinc-sulfide, zinc-selenide, zinc-telluride, zinc-salts, and mixtures thereof.
9. The dispersion of claim 7, wherein the compound comprising zinc is present in the range from about 0.1% to about 30% by weight based on the total weight of the dispersion.
10. The dispersion of claim 1, wherein the discrete carbon nanotubes have an aspect ratio of 25 to 500.
11. The dispersion of claim 1, wherein at least 70 percent by weight of the nanotubes are discrete.
12. The dispersion of claim 1, further comprising at least one dispersant.
13. The dispersion of claim 12, wherein the dispersant is selected from the group consisting of hydrophobic polymers, anionic polymers, non-ionic polymers, cationic polymers, ethylene oxide containing polymers, propylene oxide containing polymers, amphiphilic polymers, fatty acids, and mixtures thereof.

14. The dispersion of claim 1, which further comprises an additive selected from the group consisting of an epoxy resin diluent, a compound comprising zinc, a dispersant, and mixtures thereof.

15. The dispersion of claim 1 wherein at least a portion of the oxidized, discrete carbon nanotubes comprise an oxidation species selected from carboxylic acid or a derivative carbonyl containing species wherein the derivative carbonyl species is selected from ketones, quaternary amines, amides, esters, acyl halogens, and metal salts.

16. The dispersion of claim 1 wherein the oxidized, discrete carbon nanotubes comprise an oxidation species selected from hydroxyl or derived from hydroxyl containing species.

17. The dispersion of claim 1 further comprising an acrylic polymer, a silicone polymer, or a mixture thereof.

18. The dispersion of claim 1 wherein the plurality of oxidized, discrete carbon nanotubes comprise multiwall carbon nanotubes.

19. The dispersion of claim 1 further comprising at least one organic inhibitor selected from the group consisting of azoles, calcium alkyl-aryl sulfonates, diamines, and metal salts of dinonylnapathalene sulphonates.

20. A catheter comprising the dispersion of claim 1, wherein the epoxy has been at least partially cured.

21. A coating comprising the dispersion of claim 1, wherein the epoxy has been at least partially cured.

* * * * *